United States Patent [19]

Umehara

[11] Patent Number: 4,614,705
[45] Date of Patent: Sep. 30, 1986

[54] OPTICAL INFORMATION RECORDING MEDIUM

[75] Inventor: Masaakira Umehara, Yokohama, Japan

[73] Assignee: Ricoh Co., Ltd., Tokyo, Japan

[21] Appl. No.: 699,110

[22] Filed: Feb. 7, 1985

[30] Foreign Application Priority Data

Feb. 17, 1984 [JP] Japan ................................. 59-26991
May 21, 1984 [JP] Japan ................................. 59-100406
Jul. 17, 1984 [JP] Japan ................................. 59-146912
Dec. 12, 1984 [JP] Japan ................................. 59-260798

[51] Int. Cl.$^4$ ......................... G11B 7/24; B32B 27/30
[52] U.S. Cl. .................................... 430/286; 430/945; 369/284; 369/286; 369/288; 428/64; 428/65
[58] Field of Search ............... 430/286, 945; 369/284, 369/286, 288; 428/64, 65

[56] References Cited

U.S. PATENT DOCUMENTS 4,230,939 10/1980 De Bont et al. ..................... 235/488
4,374,077 2/1983 Kefeld .

Primary Examiner—Alexander S. Thomas
Attorney, Agent, or Firm—Flynn, Thiel, Boutell & Tanis

[57] ABSTRACT

This invention relates to an optical information recording medium comprising a substrate, recording information track of concavo-convex pattern, characterized in that said under layer on the substrate is formed by curing a light-curable composition by active ray irradiation, and that said light-curable composition contains at least one of photo-polymerizable components selected from the group consisting of (A) difunctional acrylate and/or methacrylate having a functional group comprising a combination of an alkylene glycol with a cycloaliphatic and/or polycycloaliphatic hydrocarbonyl group, (B) difunctional acrylate and/or methacrylate having the general formula, wherein $R_1$ represents hydrogen or methyl group and n represents an integer of 1 to 10, and (C) difunctional acrylate and/or methacrylate having the general formula, wherein $R_1$ represents hydrogen or methyl group; $R_2$ represents an alkylene group of $C_2$ to $C_4$; and n represents an integer of 1 to 20.

19 Claims, 3 Drawing Figures

OPTICAL INFORMATION RECORDING MEDIUM

BACKGROUND OF THE INVENTION (a) Field of the Invention

This invention relates to an optical information recording medium comprising a substrate having a cured under-layer of a light curable resin thereon.

(b) Description of the Prior Art

Heretofore, there are known injection process and photo-polymerization process (Philips tech. Rev., Vol. 40, pp. 298-309, 1982) as a process for forming a concavo-convex pattern information track on a substrate. However, a light memory disk prepared by the injection process causes much noise because reflected light varies due to double refraction. Furthermore, since this memory disk has poor resistance to solvents, there is the possibility that a pre-groove may be lost when a reflective layer, recording layer, protective layer and the like are formed on the information track by a wet coating process. Still furthermore, when making use of metallic light reflection by coloring matter as a recording material, various performances of focusing, tracking, regenerating signals and the like of a recording and regenerating device are badly affected because reflectivity, particularly reflectivity through the substrate is lowered due to solvent attack on the pre-groove.

On the other hand, when a pre-groove is formed by the photo-polymerization process using base polymer, diluent, photo-polymerization initiator and the like, the above mentioned double refraction and solvent resistance problems are removed, but the preservability of a thin film recording layer is poor. Thus, pinholes occur due to degradation by light and heat, and accordingly reflectivity and light absorbency are lowered.

SUMMARY OF THE INVENTION

An object of the present invention is to provide a light-curable composition curable by active ray radiation, which does not have the above mentioned conventional disadvantages and which is excellent in respects of adhesion to a substrate, solvent resistance and releasing properties from a stamper for forming a concavo-convex pattern information track.

Another object of the present invention is to provide an optical information recording medium having an under-layer formed by curing a light-curable composition on a substrate.

That is, an object of the present invention is to provide an optical information recording medium comprising a substrate, recording layer, under-layer and/or under-layer having an information track of concavo-convex pattern, characterized in that said under-layer on the substrate is formed by curing a light-curable composition by active ray irradiation, and that said light-curable composition contains at least one of photo-polymerizable components selected from the group consisting of (A) difunctional acrylate and/or methacrylate having a functional group comprising a combination of an alkylene glycol with a cycloaliphatic and/or polycycloaliphatic hydrocarbonyl group, (B) difunctional acrylate and/or methacrylate having the general formula,

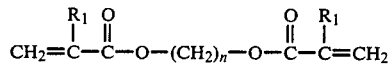

wherein $R_1$ represents hydrogen or a methyl group and n represents an integer of 1 to 10, and (C) difunctional acrylate and/or methacrylate having the general formula,

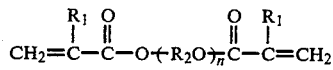

wherein $R_1$ represents hydrogen or methyl group; $R_2$ represents an alkylene group of $C_2$ to $C_4$; and n represents an integer of 1 to 20.

DETAILED DESCRIPTION OF THE INVENTION

Figure 1:
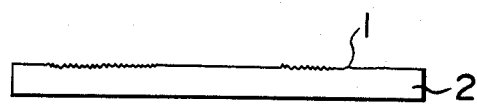
FIGS. 1 to 3 illustrates a process for preparing an optical information recording medium of the present invention.

The present invention resides in an optical information recording medium comprising a substrate, recording layer, under-layer and/or under-layer having an information track of concavo-convex pattern, characterized in that said under-layer on the substrate is formed by curing a light-curable composition by active ray irradiation, and that said light-curable composition contains at least one of photo-polymerizable components selected from the group consisting of (A) difunctional acrylate and/or methacrylate having a functional group comprising a combination of an alkylene glycol with a cycloaliphatic and/or polycycloaliphatic hydrocarbonyl group, (B) difunctional acrylate and/or methacrylate having the general formula,

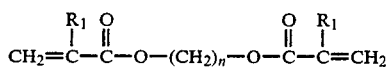

wherein $R_1$ represents hydrogen or methyl group and n represents an integer of 1 to 10, and (C) difunctional acrylate and/or methacrylate having the general formula,

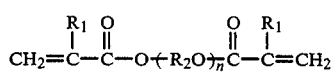

wherein $R_1$ represents hydrogen or methyl group; $R_2$ represents an alkylene group of $C_2$ to $C_4$; and n represents an integer of 1 to 20.

The under-layer may be flat or may have a concavo-convex pattern information track thereon. In order to use the optical information recording medium of the present invention for recording and regenerating information, it is necessary to provide a recording layer on said flat under-layer or on the concavo-convex pattern pre-groove or pre-format (hereinafter referred to as "concavo-convex pattern information track") formed on the under-layer. The concavo-convex pattern information track is formed by accurately transferring the concavo-convex pattern of a stamper to a substrate. Generally, a high level convex part and a low level concave part are alternatively present, and the height difference between the convex and the concave is regulated in the range of λ/4 to λ/10 (λ=the wavelength of light).

The term, "information track" used herein involves also a guide track for a pickup.

The recording layer used in the present invention includes various layers containing a metallic layer, organic coloring matter or the like as a recording material, but is not limited thereto. However, the under-layer of the present invention is most effectively used in combination with a recording medium having a recording layer containing an organic coloring matter as the main component.

Various organic coloring matters can be used, but typical examples of organic coloring matters effectively used include as follows:

I. Croconium type coloring matter

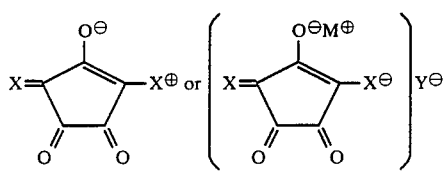

wherein X represents a chromophoric group; M⊕ represents a cation; Y⊖ represents an anion, but Y⊖ is not present when the chromophoric group contains an anion.

II. Azulene type coloring matter

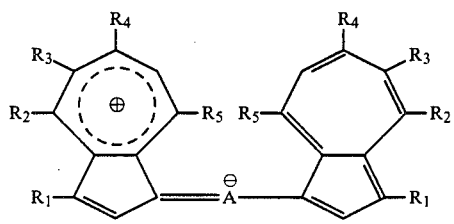

wherein A⊖ represents

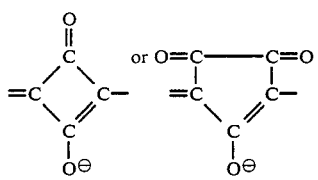

$R_1$, $R_2$, $R_3$, $R_4$ and $R_5$ represent hydrogen, alkyl group, alkoxy group, or substituted or non-substituted aryl group.

III. Triphenodithiazine compound

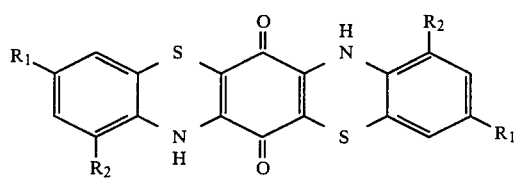

wherein $R_1$ and $R_2$ may be the same or different, and represent hydrogen, halogen, alkyl group, phenyl group and phenyl group substituted with at least one or more of alkyl group, alkoxy group, carboxyl group, carboxylate group, halogen, hydroxyl group, sulphonic acid group and sulphonate group.

IV. Phenanthrene derivatives

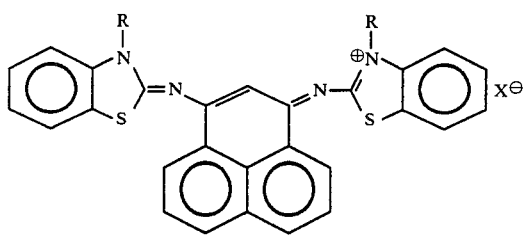

R: alkyl group such as $CH_3$, $C_2H_5$ and the like
X: $BF_4$, $ClO_4$

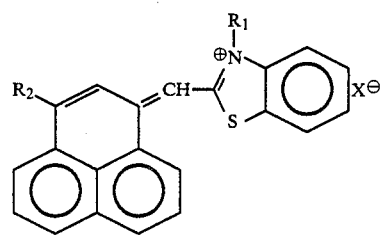

$R_1$: alkyl group such as $CH_3$, $C_2H_5$ and the like
$R_2$:

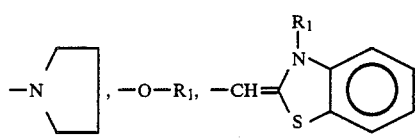

X: $BF_4$, $ClO_4$

V. Phthalocyanine type compound

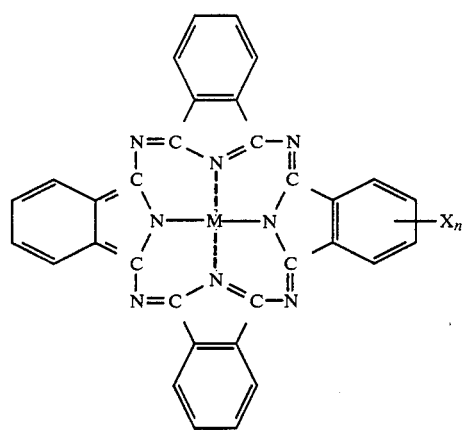

wherein M represents hydrogen, vanadium oxide, copper, beryllium, magnesium, calcium, zinc, cadmium, barium, aluminum, tin, lead, vanadium, chromium, manganese, iron, cobalt, nickel, tin halide, aluminum halide and the like. M is preferably hydrogen, lead, nickel, cobalt, copper, vanadium oxide, aluminum chloride and tin chloride. X represents hydrogen and halogens such as chlorine, bromine, iodine and fluorine, and n is an integer of 1 to 16.

VI. Tetradehydrocholine type compound

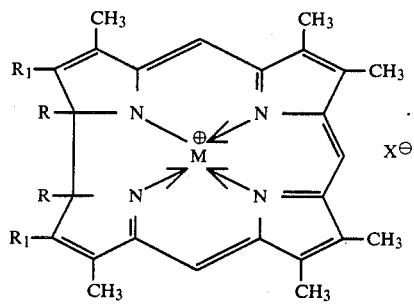

wherein R represents alkyl group, carboalkoxy group such as $COOC_2H_5$ and the like; $R_1$ represents hydrogen, alkyl and the like; and M represents H, Ni(II), Co(II), Co(III) and the like; X represents Br, $ClO_4$ and the like.

VII. Dioxadine compound and its derivatives (a) Condensed ring closure reaction product of aromatic amine with fluoranil, chloranil, bromanil or iodanil

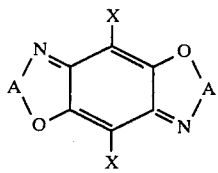

A: the residue of substituted or non-substituted aromatic amine
X: —F, —Cl, —Br, —I (b)

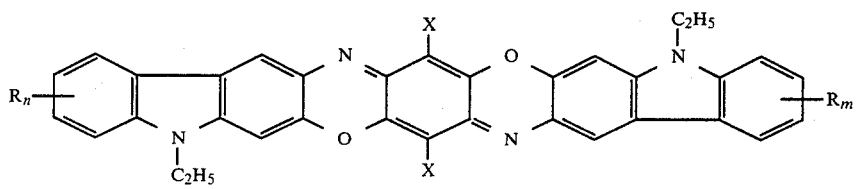

X: —F, —Cl, —Br, —I
R: —H, $-NO_2$, $-NH_2$, $-OCH_3$, $-OC_2H_5$, —F, —Cl, —Br, —I, aromatic group
m, n: 1–4

VIII. Anthraquinone derivatives

Compounds having the following structural formula

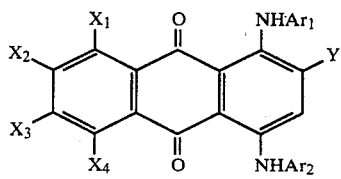

wherein $X_1$, $X_2$, $X_3$ and $X_4$ respectively represent hydrogen, alkyl group, hydroxyl group, nitro group, amino group, cyano group and halogen; Y represents hydrogen and sulphonate group; $Ar_1$ represents hydrogen, phenyl group, naphthyl group and their sulphonated products and salts, and said phenyl group may be substituted with alkyl group, alkoxy group, amino group, alkylcarbonyl group, methylthio group, halogen and phenylcarbonyl group; and $Ar_2$ represents hydrogen, phenyl group,

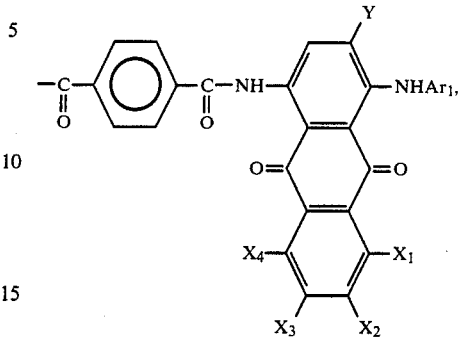

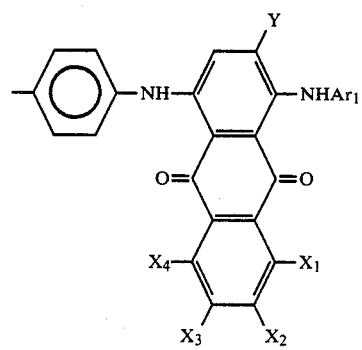

and their sulphonated products and salts, and said phenyl group may be substituted with alkyl group, alkoxy group, amino group, alkylcarbonyl group, phenylcarbonyl group and halogen.

Structural Formula (II)

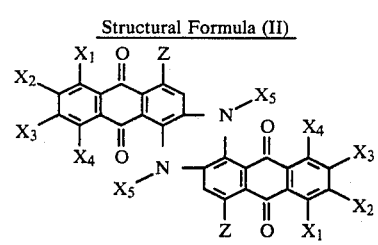

wherein $X_1$, $X_2$, $X_3$ and $X_4$ are the same as above; $X_5$ represents hydrogen and $-NH-Ar_1$; Z represents hydrogen, $-NH-Ar_1$ and $-S-Ar_1$; and $Ar_1$ is the same as above.

Particularly, a compound having an indanthrene structure as expressed by the structural formula (II) is suitable for semi-conductor laser since this compound has absorption peak in the vicinity of a wave length of 800 nm.

Examples of anthraquinone derivatives expressed by the above structural formulas (I) and (II) include 1-amino-4-(4-sulphonic acid phenylamino)-6,7-dinitroanthraquinone sodium salt,
1-anilino-2-sulphonic acid sodium-4-(4-methylphenylamino)anthraquinone,
8,17-bis-(4-methoxyphenylamino)-indanthrene,
1,4-bis(3-sulphonic acid sodium-4-methoxyphenylamino)-6,7-dicyanoanthraquinone,
1,4-bis(3-sulphonic acid sodium-4-chlorophenylamino)-5,8-dichloroanthraquinone,
1-(2-methylphenylamino)-2-sulphonic acid sodium-4-(4-aminophenylamino)-6,7-dinitroanthraquinone,
1,4-bis(3-sulphonic acid sodium-4-anilino-1-anthraquinolylamino)benzene,
1,4-bis(4-(4-sulphonic acid sodium-phenylamino)-1-annthraquinolylamino)benzene and the like.

IX. Xanthene type compound

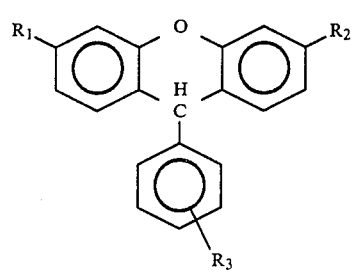

$R_1$: —OH, =O, —N(R)$_2$ (R=C$_1$-C$_{10}$ alkyl)
$R_2$: =N$^+$(R)$_2$.X$^-$ (X$^-$=acid anion, R=C$_1$-C$_{10}$ alkyl)
$R_3$: H, C$_1$-C$_{20}$ alkyl, SO$_3$Na, SO$_3$H, SO$_2$N(R)$_2$ (R=C$_1$-C$_{10}$ alkyl), COOH, COONa, COOK X. Triphenyl methane type compound

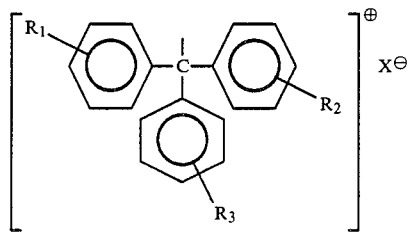

$R_1$: H, —N(R)$_2$ (R=C$_1$-C$_{10}$ alkyl), C$_1$-C$_{20}$ alkyl, —OH
$R_2$: H, —N(R)$_2$ (R=C$_1$-C$_{10}$ alkyl), C$_1$-C$_{20}$ alkyl, —OH
$R_3$: H, C$_1$-C$_{20}$ alkyl, halogen, SO$_3$H, —N(R)$_2$ (R=C$_1$-C$_{10}$ alkyl)
X$^\ominus$: acid anion XI. Squarylium type dye

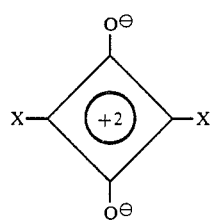

wherein X represents a chromophoric group. Typical examples include as follows:

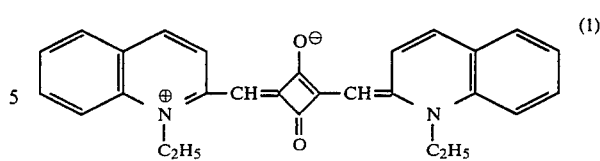
(1)

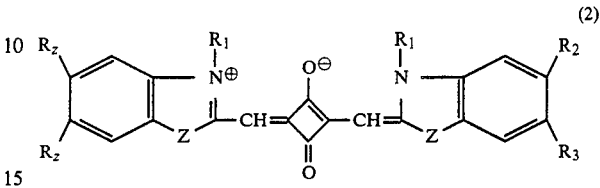
(2)
(a) $R_1$ = CH$_3$, $R_2$ = $R_3$ = H, Z = S
(b) $R_1$ = $R_z$ = CH$_3$, $R_3$ = H, Z = Se
(c) $R_1$ = C$_2$H$_5$, $R_z$ = CH$_3$, $R_3$ = H, Z = Se

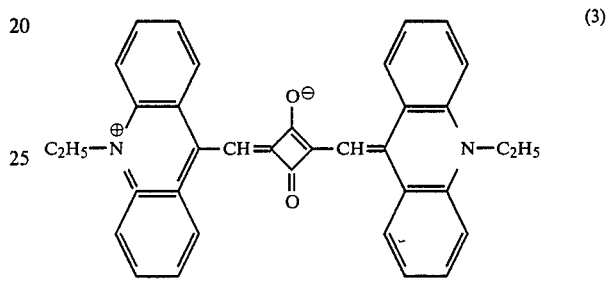
(3)

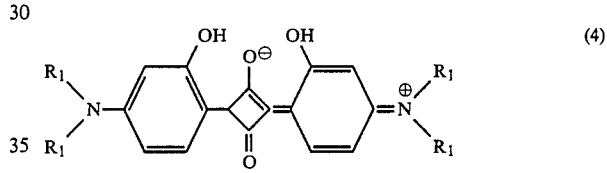
(4)
(a) $R_1$ = CH$_3$
(b) $R_1$ = C$_2$H$_5$

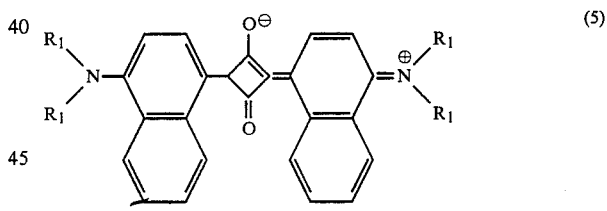
(5)
(a) $R_1$ = CH$_3$
(b) $R_1$ = C$_2$H$_5$

XII. Polymethine type compound having a polymethine chain
(a) Pyrylium type compound

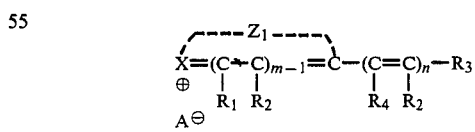

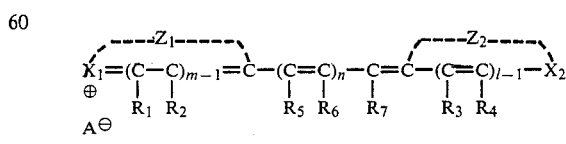

wherein
X$_1$ and X$_2$ represent sulphur atom, oxygen atom or selenium atom;

$Z_1$ represents a hydrocarbonyl group comprising atomic groups necessary for composing pyrylium, thiopyrylium, selenapyrylium, benzopyrylium, benzothiopyrylium, benzoselenapyrylium, naphthopyrylium, naphthothiopyrylium or naphthoselenapyrylium which may be substituted or non-substituted;

$Z_2$ represents a hydrocarbonyl group comprising atomic groups necessary for composing pyran, thiopyran, selenapyran, benzopyran, benzothiopyran, benzoselenapyran, naphthopyran, naphthothiopyran or naphthoselenapyran;

$R_1$, $R_2$, $R_3$ and $R_4$ represent hydrogen atom, substituted or non-substituted alkyl group, or substituted or non-substituted aryl group;

$R_5$, $R_6$ and $R_7$ represent hydrogen atom, halogen atom, substituted or non-substituted alkyl, substituted or non-substituted aryl, or substituted or non-substituted aralkyl;

m and l represent 1 or 2; and n represents 0, 1 or 2.

(b) Cyanine coloring matter and merocyanine coloring matter

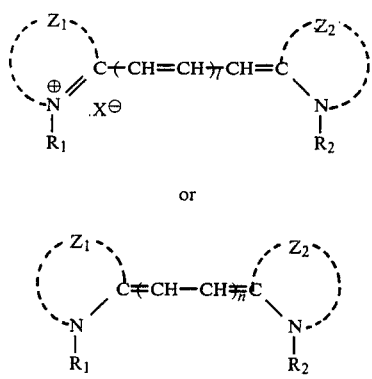

wherein $R_1$ and $R_2$ may be the same or different and represent alkyl, hydroxyalkyl, alkoxyalkyl, aralkyl, carboxyalkyl, carboxyalkylate bonded with an alkaline metal cation, sulphoalkyl, or sulphone alkyl bonded with alkaline metal cation or sulphoalkyl;

$Z_1$ and $Z_2$ represent 5 membered or 6 membered heterocyclic rings or atomic groups capable for composing a condensed ring comprising 5 membered or 6 membered heterocyclic rings;

l represents an integer of 1 to 4; and

X represents an acid anion.

Examples of these heterocyclic rings include indole type, thiazole type, oxazole type, pyrrole type and the like.

(c)

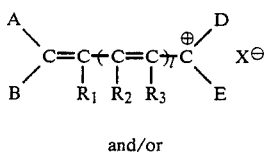

and/or

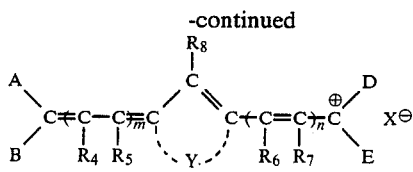

wherein A, B, D and E represents a subsituted or non-substituted aryl group; $R_1$ to $R_8$ may be the same or different, and represent hydrogen atom, halogen atom or an alkyl group; Y represents a divalent residue having atomic group necessary for composing 5 membered or 6 membered ring; m, n and l represent 0, 1 or 2; and $X^\ominus$ represents acid anion.

(d) Croconium type coloring matter bonded with polymethine chain.

(e) Azulene type coloring matter bonded with polymethine chain.

Typical examples of polymethine type compounds are listed above, but it should be understood that other polymethine type compounds which can not be expressed by the above chemical formulas can also be used in the present invention.

Among the above mentioned organic coloring matters I to XII, polymethine type compound (XII) is preferable. Particularly, among the polymethine type compounds (XII), cyanine coloring matter is most preferable. The most effective combination comprises a recording layer containing a cyanine coloring matter and an under layer containing the above mentioned cycloaliphatic type photo-polymerizable component (A).

The following compounds XIII and XIV are optionally used depending on use.

XIII. Low molecular compound selected from the group of plasticizer, surfactant, antistatic agent, slip additive, fire retardant, stabilizer, dispersing agent, antioxidant, light resistance improver and the like.

XIV. High molecular compound selected from the group of ionomer resin, polyamide resin, vinyl type resin, natural high molecular compound, silicone, liquid rubber, silane coupler and the like.

The recording layer of the present invention can be formed by ordinary techniques such as vapor deposition, spattering, CVD, solution coating or the like. When organic coloring matter is used as a recording material, it is efficient to coat a solution containing the coloring matter dissolved in an organic solvent by a coating process such as spraying, roller coating, dipping, spinning or the like. Particularly, the spin-coating process is preferable in order to obtain a film having uniform thickness and homogeneous properties.

The thickness of the recording layer is generally 10 to 1000 nm, preferably 20 to 70 nm.

The thickness of the under-layer is 1 to 200 um, preferably 10 to 100 um.

Examples of the photo-polymerizable components used to prepare the under-layer of the present invention include the following compounds (A), (B) and (C). These compounds are used alone or in combination of two or more.

(A) difunctional acrylate and/or methacrylate having a functional group comprising a combination of an alkylene glycol with a cycloaliphatic and/or polycycloaliphatic hydrocarbonyl group:

The term, "cycloaliphatic hydrocarbonyl group" used herein refers to a cycloaliphatic hydrocarbonyl group such as cyclopropane, cyclobutane, cyclopentane, cyclohexane and the like.

The term, "polycycloaliphatic hydrocarbonyl group" used herein refers to a bicycloaliphatic hydrocarbonyl group such as bicycloheptane or the like, a tricycloaliphatic hydrocarbonyl group such as tricyclodecane or the like, and a cycloaliphatic hydrocarbonyl group having a condensed ring bonded with the above mentioned bicycloaliphatic hydrocarbon or tricycloaliphatic hydrocarbon.

Preferable examples of the compound (A) are expressed by the general formula,

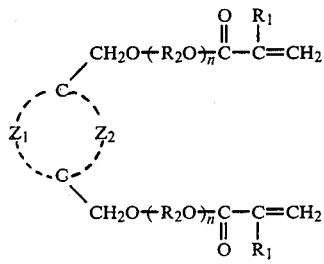

wherein $R_1$ represents hydrogen or methyl group; $R_2$ represents an alkylene group of $C_2$ to $C_4$; n represents an integer of 0 to 8; and $Z_1$ and $Z_2$ form a cycloaliphatic group with an adjacent carbon atom.

Typical examples of the compound (A) include
2,3-bisacryloyloxyethyloxymethylbicyclo-(2-2-1)heptane,
1,2-bisacryloyloxymethylcyclohexane,
3,8-bisacryloyloxyethyloxymethyltricyclo(5-2-1-0)decane,
3,4-bisacryloyloxyethyloxymethylbicyclo(4-3-0)nonane,
3,4-bisacryloyloxyethyloxyethyloxymethylbicyclo(4-4-0)decane,
2,3-bismethacryloyloxyethyloxymethylbicyclo(2-2-1)heptane and
3,8-bismethacryloyloxymethylcyclohexane.

(B) Difunctional acrylate and/or methacrylate having the general formula,

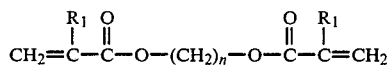

wherein $R_1$ represents hydrogen or methyl group and n represents an integer of 1 to 10:

Typical example of the compounds (B) include methanedioldiacrylate, 1,2-ethanedioldiacrylate, 1,2-propanedioldiacrylate, 1,4-butanedioldiacrylate, neopentylglycoldiacrylate, 1,3-butanedioldiacrylate, 1,6-hexanedioldiacrylate, 1,5-pentanedioldiacrylate, 1,7-heptanedioldiacrylate, 1,6-heptanedioldiacrylate, 1,8-octanedioldiacrylate and their dimethacrylates.

(C) Difunctional acrylate and/or methacrylate having the general formula,

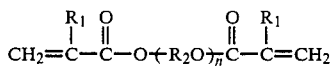

wherein $R_1$ represents hydrogen or methyl group; $R_2$ represents an alkylene group of $C_2$ to $C_4$; and n represents an integer of 1 to 20:

Typical examples of the compound (C) include diethyleneglycoldiacrylate, triethyleneglycoldiacrylate, tripropyleneglycoldiacrylate and their dimethacrylates.

The above mentioned diacrylate and/or dimethacrylate can be used in mixture with other monoacrylate, monomethacrylate, diacrylate, dimethacrylate, triacrylate, trimethacrylate, tetraacrylate, tetramethacrylate or the like.

Among the above mentioned photo-polymerizable compounds (A), (B) and (C), the cycloaliphatic type photo-polymerizable component (A) is most preferable in view of heat-resistance and other properties. That is, the heat-resistance of the recording medium prepared by using the component (A) is much higher than that of the recording medium prepared by other components.

In addition to the above mentioned photo-polymerizable components, the light-curable composition used in the present invention further contains a photo-polymerization initiator and may further contain a sensitizer, preservation stabilizer and the like if necessary.

The initiator is used in an amount of 0.05 to 10 parts by weight, preferably 0.2 to 5 parts by weight to 100 parts by weight of a photo-polymerizable component.

The sensitizer is used preferably in an amount of 0.01 to 5 parts by weight to 100 parts by weight of a photo-polymerizable component.

The preservation stabilizer is used preferably in an amount of 0.001 to 2 parts by weight to 100 parts by weight of a photo-polymerization component.

The conventional known initiators can be used in the present invention, typical examples of which include as follows:

acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoin, benzoinmethylether, benzoinethylether, benzoinisopropylether, benzoin-n-propylether, benzoinisobutylether, benzoin-n-butylether, benzyldimethylketal, tetramethylthiurammonosulphide, thioxanthone, 2-chlorothioxanthone, 2-methylthioxanthone, azobisisobutylonitrile, benzoinperoxide, di-tert-butylperoxide, p-isopropyl-alpha-hydroxyisobutylphenone, alpha-hydroxyisobutylphenone, dibenzosuberone, diethylthioxanthone, and the like.

Examples of the sensitizer include as follows:
(a) Amines:
aliphatic amines, amines containing an aromatic group, compounds having nitrogen forming a ring such as piperidine, and the like.
(b) Urea:
allyl type urea, o-tolylthiourea, and the like.
(c) Sulphur compounds:
sodium diethyldithiophosphate, soluble salt of aromatic sulphinic acids such as s-benzylisothiuronium-p-toluene sulphinate, and the like.
(d) nitriles:
N,N-disubstituted-p-aminobenzonitrile type compounds.
(e) Phosphor compounds:
tri-n-butyl phosphine, sodium diethyldithiophosphate, and the like.
(f) Other nitrogen compounds:
N-nitrosohydroxylamine derivatives, oxazolidine compounds, tetrahydro-1,3-oxazine compound, condensation products of diamine with formaldehyde or acetaldehyde, Michler's ketone, isoamyl p-N,N-dimethylaminobenzoate, and the like.

Examples of the preservation stabilizer include as follows:

Quaternary ammonium chlorides (such as benzyltrimethylammonium chloride), diethylhydroxyamine, cyclic amides, nitrile compounds, substituted urea, benzothiazole, 4-amino-2,2,6,6-tetramethylpiperidine, bis-(1,2,2,6,6-pentamethyl-4-piperidinyl)sebacate, organic acid (such as lactic acid, oxalic acid, citric acid, tartaric acid, benzoic acid and the like), hydroquinone (and its methyl ether), tert-butylpyrocatechol, $(RO_3)_3P$ and copper compounds, organic phosphine $P(R)_3$ and phosphite, cupper compound (such as cupper naphthenate), addition producut of cuprous chloride and trichloroethyl phosphite.

The substrate used in the present invention must be transparent to an active ray (such as ultraviolet ray, light or the like) used for curing the photo-polymerizable component. Examples of the substrate include glass plate, plastic plate and the like. Examples of the material for the plastic plate include acryl resins (such as methyl acrylate, ethyl acrylate, n-propyl acrylate, n-butyl acrylate, isobutyl acrylate, n-pentyl acrylate, isopentyl acrylate, n-hexyl acrylate, isohexyl acrylate, n-heptyl acrylate, isoheptyl acrylate, n-octyl acrylate, 2-ethylhexyl acrylate and the like, or their corresponding methacrylate), polystyrene resin, polycarbonate, cellulose resin, cellulose triacetate, polystyrene terephthalate, and their mixtures or copolymers. Among them, polymethacrylate resin and polycarbonate resin are preferable. Particularly, polycarbonate resin is the most preferable. When using polymethacrylate resin, it is preferable to provide a pre-coat layer of a silane coupling agent or the like or an acryl type hard coat layer to improve the adhesion between the light-curable composition and the substrate. However, in the case of polycarbonate resin, it is not necessary to provide such a layer because the adhesion between the light-curable composition and the polycarbonate is quite satisfactory.

A typical embodiment for forming an under-layer having a concavo-convex pattern information track on a substrate in accordance with the present invention is illustrated by the accompanying drawings.

FIG. 1 shows a stamper 2 having a concavo-convex pattern information track 1 which should be transferred to an under-layer. The material of this stamper is generally nickel, chromium or their alloy, and the surface of the stamper may be subjected to hardening treatment if necessary. This material is preferably transparent to ultraviolet ray. For example, quartz glass is preferable.

Figure 2:
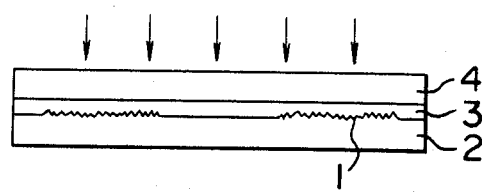

As can be seen from FIG. 2, a light-curable composition 3 is then applied on the stamper 2 and a substrate 4 is superimposed thereon. Thereafter, an active ray is irradiated to cure the light-curable composition 3. Examples of a light source of the active ray include a low pressure mercury lamp, high pressure mercury lamp, ultra-high pressure mercury lamp, xenon lamp, metal halide lamp, carbon arc, ultraviolet ray fluorescent lamp and the like.

Figure 3:
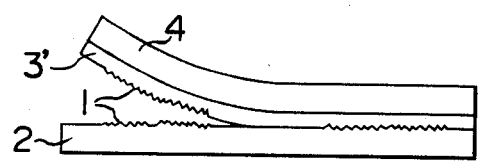

After irradiation by the active ray, the substrate 4 is released from the stamper 2 as illustrated by FIG. 3. The substrate 4 thus treated bears the light-cured layer (under-layer) 3' having the concavo-convex pattern 1 accurately transferred from the stamper 2. This transferring process can be effected only when the light-curable composition of the present invention is used. That is, the bonding strength A between the light-curable composition and the substrate must be larger than the bonding strength B between the light-curable composition and the stamper (i.e. A>B). In order to further improve the above mentioned relation of the bonding strength, the substrate may be subjected to surface treatments such as pre-coating (application of pre-coat layer of silane coupling agent or acryl type hard coat layer), corona discharge treatment, flame treatment, ultraviolet treatment, microwave treatment, glow discharge treatment, active plasma irradiation treatment, laser ray irradiation treatment and the like.

In order to use the above prepared recording medium of the present invention for recording and regenerating information, it is necessary to apply a recording layer such as metallic thin film, organic coloring matter thin film or the like on the light-cured layer having the information track. The application of the recording layer can be conducted by ordinary processes such as coating, vapor-deposition and the like.

DESCRIPTION OF THE PREFERRED EMBODIMENTS

The present invention is further illustrated by the following Examples and Comparative Examples, but is not limited thereto. Amounts of all the components are expressed by parts by weight unless otherwise specified.

EXAMPLE 1

| | |
|---|---:|
| 2,3-bisacryloyloxyethyloxymethylbicyclo(2-2-1) heptane | 100 parts |
| 2,2-dimethoxy-2-phenylacetophenone | 3 parts |

The above components are fully mixed to prepare a light-curable liquid composition. The composition thus prepared was dropped onto a nickel stamper having a concavo-convex information track pattern and a polymethylmethacrylate substrate (a cured film is formed as a hard coat layer on the substrate; "Acrylite Ar" by Mitsubishi Rayon Ltd.) was superimposed thereon. Thereafter, ultraviolet ray was irradiated to this laminate for 1 minute by a high pressure mercury lamp at an intensity of 80 W/cm. The substrate was then released from the nickel stamper, thus the concavo-convex pattern being accurately transferred to the substrate. The power required for releasing was 0.2 kg/cm$^2$, and the bonding strength of the light-cured layer to the substrate was 0.8 kg/cm$^2$. The recording medium thus prepared was dipped in isopropyl alcohol for 15 minutes and the medium was then dried. The transferred concavo-convex pattern did not change and was not damaged at all even after this treatment. The medium was dipped also in 2,2-dichloroethane for 30 seconds and was dried, but the concavo-convex pattern did not change at all.

0.7% 2,2-dichloroethane solution containing cyanine coloring matter having the following chemical formula was spin-coated at 1000 rpm on the information track, and was dried.

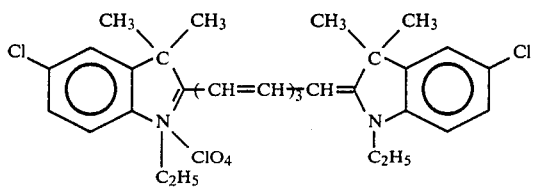

The recording medium thus prepared was tested under a 54,000 lux tungsten light and at 150° C., and the results are shown in the following table.

EXAMPLE 2

| 1,2-bisacryloyloxymethylcyclohexane | 100 parts |
|---|---|
| diethylthioxanthone | 0.5 part |

A recording medium was prepared and tested in the same manner as in Example 1, except that the above components were used to prepare a light-curable liquid composition. The results are shown in the following table.

EXAMPLE 3

| 3,8-bisacryloyloxyethyloxymethyl-tricyclo(5-2-1-0)decane | 100 parts |
|---|---|
| chlorothioxanthone | 0.5 part |

A recording medium was prepared and tested in the same manner as in Example 1, except that the above components were used to prepare a light-curable liquid composition. The results are shown in the following table.

EXAMPLE 4

| 1,4-butanedioldiacrylate | 100 parts |
|---|---|
| 2,2-dimethoxy-2-phenylacetophenone | 3 parts |

A recording medium was prepared and tested in the same manner as in Example 1, except that the above components were used to prepare a light-curable liquid composition. The results are shown in the following table.

EXAMPLE 5

| 1,6-hexanedioldiacrylate | 100 parts |
|---|---|
| diethylthioxanthone | 0.5 part |

A recording medium was prepared and tested in the same manner as in Example 1, except that the above components were used to prepare a light-curable liquid composition. The results are shown in the following table.

EXAMPLE 6

| 1,6-hexanedioldiacrylate | 100 parts |
|---|---|
| 2,2-dimethoxy-2-phenylacetophenone | 3 parts |
| isopentyl paradimethylaminobenzoate | 1 part |

A recording medium was prepared and tested in the same manner as in Example 1, except that the above components were used to prepare a light-curable liquid composition. The results are shown in the following table.

EXAMPLE 7

| tripropyleneglycoldiacrylate | 100 parts |
|---|---|
| 2,2-dimethoxy-2-phenylacetophenone | 3 parts |

Cyanine Coloring Matter

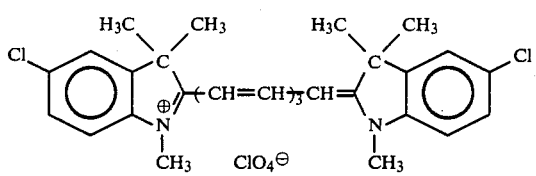

A recording medium was prepared and tested in the same manner as in Example 1, except that the above components were used to prepared a light-curable liquid composition, and that the above cyanine coloring matter was used.

The results are shown in the following table.

EXAMPLE 8

| ethyleneglycoldiacrylate | 100 parts |
|---|---|
| diethylthioxanthone | 0.5 part |

A recording medium was prepared and tested in the same manner as in Example 7, except that the above components were used to prepare a light-curable liquid composition. The results are shown in the following table.

EXAMPLE 9

| triethyleneglycoldiacrylate | 100 parts |
|---|---|
| chlorothioxanthone | 0.5 part |

A recording medium was prepared and tested in the same manner as in Example 7, except that the above components were used to prepare a light-curable liquid composition. The results are shown in the following table.

EXAMPLE 10

| 3,4-bisacryloyloxyethyloxyethyloxymethyl-bicyclo(4-4-0)decane | 100 parts |
|---|---|
| 2,2-dimethoxy-2-phenylacetophenone | 3 parts |

A recording medium was prepared and tested in the same manner as in Example 1, except that the above components were used to prepare a light-curable liquid composition. The results are shown in the following table.

EXAMPLE 11

| 3,8-bisacryloyloxyethyloxymethyl-tricyclo(5-2-1-0)decane | 70 parts |
|---|---|
| 1,6-hexanedioldiacrylate | 30 parts |

-continued

| 2,2-dimethoxy-2-phenylacetophenone | 3 parts |

A recording medium was prepared and tested in the same manner as in Example 1, except that the above components were used to prepare a light-curable liquid composition. The results are shown in the following table.

EXAMPLE 12

| 2,3-bisacryloyloxyethyloxymethyl-bicyclo(2-2-1)heptane | 100 parts |
| 2,2-dimethoxy-2-phenylacetophenone | 3 parts |

A recording medium was prepared and tested in the same manner as in Example 7, except that the above components were used to prepare a light-curable liquid composition, and that a flat polycarbonate substrate of a thickness of 1.2 mm prepared by injection molding polycarbonate resin l"5503" by Teijin Kasei) was used in place of the polymethacrylate substrate.

The results are shown in the following table.

EXAMPLE 13

| 1,2-bisacryloyloxymethylcyclohexane | 100 parts |
| diethylthioxanthone | 0.5 part |

A recording medium was prepared and tested in the same manner as in Example 12, except that the above components were used to prepare a light-curable liquid composition. The results are shown in the following table.

EXAMPLE 14

| 3,8-bisacryloyloxyethyloxymethyl-tricyclo(5-2-1-0)decane | 100 parts |
| chlorothioxanthone | 0.5 part |

A recording medium was prepared and tested in the same manner as in Example 12, except that the above components were used to prepare a light-curable liquid composition. The results are shown in the following table.

COMPARATIVE EXAMPLE 1

| bis(acryloxyethoxy)bisphenol A | 100 parts |
| 2,2-dimethoxy-2-phenylacetophenone | 3 parts |

A recording medium was prepared and tested in the same manner as in Example 1, except that the above components were used to prepare a light-curable liquid composition. The results are shown in the following table.

As can be seem from the following table, the resistance to solvent is almost the same as those of the products of the present invention, but the degradation speed by heat and/or light is much higher than those of the products of the present invention.

COMPARATIVE EXAMPLE 2

$$CH_2=CHCOO(CH_2)_5O-[CO-C_6H_4-COO(CH_2)_5O]_2-OCOCH=CH_2 \quad 100 \text{ parts}$$

| 2,2-dimethoxy-2-phenylacetophenone | 3 parts |

A recording medium was prepared and tested in the same manner as in Example 1, except that the above components were used to prepare a light curable composition, but the transfer of an information track of concavo-convex pattern could not be effected because cohesion destruction was caused.

TABLE 1

|  | Bonding[1] Strength (Kg/cm$^2$) | Releasing[2] Properties (Kg/cm$^2$) | EDC[3] Resistance | Heat Degradation[4] Test | Light Degradation[5] Test |
| --- | --- | --- | --- | --- | --- |
| Example 1 | 0.8 | 0.2 | O | 1.1 | 1.0 |
| Example 2 | 0.97 | 0.2 | O | 1.2 | 1.0 |
| Example 3 | 1.1 | 0.2 | O | 1 | 1.1 |
| Example 4 | 0.97 | 0.21 | O | 1.7 | 1.0 |
| Example 5 | 0.97 | 0.19 | O | 1.5 | 1.0 |
| Example 6 | 1.1 | 0.2 | O | 1.3 | 1.0 |
| Example 7 | 1.1 | 0.2 | O | 2.0 | 1.1 |
| Example 8 | 1.5 | 0.2 | O | 2.3 | 1.3 |
| Example 9 | 1.2 | 0.2 | O | 2.1 | 1.2 |
| Example 10 | 0.9 | 0.21 | O | 1.2 | 1.2 |
| Example 11 | 1.1 | 0.20 | O | 1.25 | 1.0 |
| Example 12 | 1.2 | 0.2 | O | 1.1 | 1.0 |
| Example 13 | 1.3 | 0.2 | O | 1.2 | 1.0 |
| Example 14 | 1.5 | 0.2 | O | 1.0 | 1.1 |
| Comparative Example 1 | 1.4 | 0.33 | O | 9.3 | 3.7 |
| Comparative Example 2 | 1.6 | 0.68 | — | — | — |

Note:
[1]Bonding strength of light-cured layer to substrate.
[2]Releasing properties of substrate from stamper.
[3]Resistance of light-cured layer to ethylene dichloride (EDC).
[4]Relative value obtained by dividing logarithm of change rate of optical density (O.D.) of 790 nm by time.
[5]Relative value of gradient of change by time in natural logarithm of optical density.

As can be seen from the above results, the substrate having a concavo-convex pattern formed by using a light curable composition of the present invention can be satisfactorily released from a stamper, thus the transfer of the concavo-convex pattern can be accurately effected. The concavo-convex pattern thus formed also has excellent resistance to solvent, and satisfactorily retains its figure even after forming a coloring matter thin film thereon. Thus, an optical memory disk having a high reflectivity and satisfactory preservability can be provided.

What we claim is:

1. An optical information recording medium comprising a substrate, a recording layer and an under layer between said substrate and said recording layer, said under layer having been formed by curing, with radiation, a light-curable composition consisting essentially of a photo-polymerizable component and a photo-polymerization initiator, wherein said photo-polymerizable component of said light-curable composition consists of one or more members selected from the group consisting of (A) difunctional acrylates and difunctional methacrylates having a cycloaliphatic or polycycloaliphatic hydrocarbon group combined with an alkyleneglycol, (B) difunctional acrylates and difunctional methacrylates having the formula

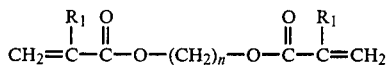

wherein $R_1$ is hydrogen or methyl, and n is an integer of 1 to 10, and (C) difunctional acrylates and difunctional acrylates having the formula

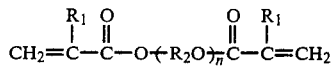

wherein $R_1$ has the same meaning as defined above, $R_2$ is alkylene of $C_2$ to $C_4$ and n is an integer of 1 to 20.

2. The optical information recording medium according to claim 1, wherein said recording layer contains an organic coloring matter.

3. The optical information recording medium according to claim 2, wherein said organic coloring matter is a polymethine type coloring matter.

4. The optical information recording medium according to claim 3, wherein said polymethine type coloring matter is a cyanine type coloring matter.

5. The optical information recording medium according to claim 4, wherein said cyanine type coloring matter is an indole type cyanine coloring matter.

6. The optical information recording medium according to claim 1, wherein said under layer has a thickness of 1 to 200 μm.

7. The optical information recording medium according to claim 1, wherein said under layer has a thickness of 10 to 100 μm.

8. The optical information recording medium according to claim 1, wherein said recording layer has a thickness of 10 to 1000 nm.

9. The optical information recording medium according to claim 1, wherein said recording layer has a thickness of 20 to 70 nm.

10. The optical information recording medium according to claim 1, wherein said substrate is polycarbonate resin.

11. The optical information recording medium according to claim 1, wherein said photo-polymerizable component is (A) and has the general formula,

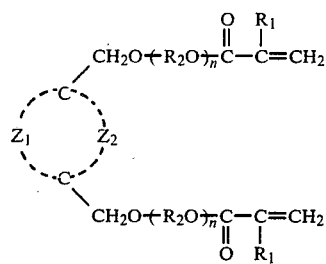

wherein $R_1$ represents hydrogen or methyl; $R_2$ represents an alkylene of $C_2$ to $C_4$; n represents an integer of 0 to 8; and $Z_1$ and $Z_2$ form a cycloaliphatic group with an adjacent carbon atom.

12. The optical information recording medium according to claim 11, wherein said recording layer contains a cyanine type coloring matter.

13. The optical information recording medium according to claim 12, wherein said substrate is polycarbonate resin.

14. The optical information recording medium according to claim 1, wherein said photo-polymerizable component is (A) and is selected from the group consisting of:
2,3-bisacryloyloxyethyloxymethylbicyclo-(2-2-1)heptane,
1,2-bisacryloyloxymethylcyclohexane,
3,8-bisacryloyloxyethyloxymethyltricyclo(5-2-1-0)decane,
3,4-bisacryloyloxyethyloxymethylbicyclo(4-3-0)nonane,
3,4-bisacryloyloxyethyloxyethyloxymethylbicyclo(4-4-0)decane,
2,3-bismethacryloyloxyethyloxymethylbicyclo(2-2-1)heptane and
3,8-bismethacryloyloxymethylcyclohexane.

15. The optical information recording medium according to claim 14, wherein said recording layer contains a cyanine type coloring matter.

16. The optical information recording medium according to claim 15, wherein said substrate is polycarbonate resin.

17. The optical information recording medium according to claim 1, wherein said photo-polymerizable component is (B) and is selected from the group consisting of: 1,2-methanedioldiacrylate, 1,2-ethanedioldiacrylate, 1,2-propanedioldiacrylate, 1,4-butanedioldiacrylate, neopentylglycoldiacrylate, 1,3-butanedioldiacrylate, 1,6-hexanedioldiacrylate, 1,5-pentanedioldiacrylate, 1,7-heptanedioldiacrylate, 1,6-heptanedioldiacrylate, 1,8-octanedioldiacrylate and their dimethacrylates.

18. The optical information recording medium according to claim 1, wherein said photo-polymerizable component is (C) and is selected from the group consisting of: diethyleneglycoldiacrylate, triethyleneglycoldiacrylate, tripropyleneglycoldiacrylate and the corresponding dimethacrylates.

19. The optical information recording medium according to claim 1 in which said under layer has an information track of concavo-convex pattern on one surface thereof.

* * * * *